US008043006B2

(12) United States Patent
Schniederjan et al.

(10) Patent No.: US 8,043,006 B2
(45) Date of Patent: Oct. 25, 2011

(54) AXIAL PISTON MACHINE WITH AN ELONGATED GUIDE ELEMENT FOR A CAGE SEGMENT

(75) Inventors: Reinhold Schniederjan, Neu-Ulm (DE); Jerzy Kreja, Nersingen (DE)

(73) Assignee: Brueninghaus Hydromatik GmbH, Elchingen (DE)

( * ) Notice: Subject to any disclaimer, the term of this patent is extended or adjusted under 35 U.S.C. 154(b) by 648 days.

(21) Appl. No.: 11/989,979

(22) PCT Filed: Aug. 2, 2006

(86) PCT No.: PCT/EP2006/007653
§ 371 (c)(1),
(2), (4) Date: Mar. 7, 2008

(87) PCT Pub. No.: WO2007/014768
PCT Pub. Date: Feb. 8, 2007

(65) Prior Publication Data
US 2010/0089230 A1  Apr. 15, 2010

(30) Foreign Application Priority Data
Aug. 4, 2005  (DE) .................. 10 2005 036 853

(51) Int. Cl.
*F04B 1/20* (2006.01)
*F16C 32/00* (2006.01)
(52) U.S. Cl. .............. 384/2; 384/569; 384/572; 92/12.2
(58) Field of Classification Search .................. 384/523, 384/569, 572, 2; 92/12.2
See application file for complete search history.

(56) References Cited

U.S. PATENT DOCUMENTS

| 4,627,330 A | 12/1986 | Beck, Jr. |
| 5,630,352 A | 5/1997 | Todd |

FOREIGN PATENT DOCUMENTS

| DE | 26 25 298 | 12/1977 |
| DE | 75 15 346 | 12/1978 |
| DE | 30 00 921 A1 | 7/1981 |
| DE | 30 00 922 A1 | 7/1981 |
| DE | 300 922 C | 7/1981 |
| DE | 36 10 914 A1 | 1/1987 |
| DE | 195 38 835 C 1 | 3/1997 |
| DE | 696 09 582 T 2 | 4/2001 |
| EP | 0 398 146 A1 | 11/1990 |
| EP | 0 649 974 A1 | 4/1995 |
| EP | 0 649 974 B1 | 4/1995 |
| FR | 2 353 747 A1 | 12/1977 |
| JP | 2005-226551 | 8/2005 |
| RU | 823 626 A1 | 4/1981 |

*Primary Examiner* — William C Joyce
(74) *Attorney, Agent, or Firm* — Scully, Scott, Murphy & Presser, P.C.

(57) ABSTRACT

An axial piston machine of swashplate construction is provided. The axial piston machine has two pivot bearing parts. In order to improve the guiding of a cage segment mounted within a gap between the two pivot bearing parts, a guide element, in the region of its rotary bearing connected to the cage segment is displaceably connected to the cage segment by an elongated guide in a longitudinal direction. The guide member, in the region of its end region connected to the other pivot bearing part, is rotatable by an associated rotary bearing and rigidly connected in the longitudinal direction to one of the two pivot bearing parts.

11 Claims, 3 Drawing Sheets

AXIAL PISTON MACHINE WITH AN ELONGATED GUIDE ELEMENT FOR A CAGE SEGMENT

BACKGROUND

The invention relates to an axial piston machine.

An axial piston machine is disclosed in EP 0 649 974 B1.

With axial piston machines of swashplate construction, it is known to construct a swashplate on one of two pivot bearing parts which, on two sides facing one another, have curved guide surfaces in the shape of a circular arc section, between which a gap in the shape of a circular arc section is present, in which a cage segment is mounted with a plurality of rolling elements. In this case, the axial piston machine has variable through-put volume, the swashplate thereof being able to be pivoted to and fro in the aforementioned so-called cradle bearing by an adjusting device. With such pivoting movements in the peripheral direction of the circular-arc-shaped curvature, the cage segment is also moved in the direction of the circular arc, the length of movement thereof, due to the rolling function of the rolling elements, being substantially only half as great as the pivoting movement of the swashplate. During the operation of the axial piston machine, in particular with rapid reciprocal movements of the swashplate, the possibility may not be ruled out that the cage segment is displaced in the direction of the circular arc relative to its pivoting range associated therewith. This is undesirable as the cage segment thereby loses its desired support position.

In order to avoid such alterations to the position of the cage segment, it is known to secure the cage segment in its desired pivoted position by a guide device with an elongated guide element. A guide device disclosed in EP 0 649 974 B1 has an elongated guide element which is formed on both ends of the guide element and in the central region thereof from a one-piece wire which has one respective circular wire loop formed by bending the wire. The guide element may be rotatably mounted, with the central wire loop parallel to the pivoting plane, on a bearing pin projecting laterally from the cage segment. In this connection, the guide element may be rotated in its central region and is rigidly connected to the guide segment in its longitudinal direction. The wire loops at the ends of the guide element are respectively displaceably mounted in a sliding guide in the longitudinal direction thereof on the pivot bearing parts.

As a result of this known embodiment, the guide element is stabilised at its ends, namely by the shape of the wire loops, but the guide element in its central region is not only considerably wider than the wire cross-section, by means of the wire loop located there in the shape of a spiral, but the guide element also has a relatively low moment of resistance against bending.

SUMMARY

An exemplary aspect of the invention is related to improving the guiding of the cage segment in an axial piston machine disclosed in EP 0 649 974 B1. Furthermore, a small and, in particular, narrow construction is intended to be achieved for the cage guide, a stable and loadable construction being also intended to be achieved.

The recognition underlying the invention is that the elongated guide element, relative to its respective connection with the cage segment and the pivot bearing parts, has to be held on one of these parts against a movement in its longitudinal direction, such support being able to be arranged on one of the two pivot bearing parts.

With the axial piston machine according to the invention, the guide element in the region of its joint connecting the cage segment is displaceably connected in its longitudinal direction to the cage segment by a longitudinal guide and it is rigidly connected in its longitudinal direction to the other pivot bearing part in the region of its end facing away from the round head. This embodiment allows a simple, small and, in particular, narrow construction of the cage segment guide and/or of the guide element. In this case, it has to be considered that the region of the joint connecting the cage segment does not have to be in contact with a joint pin, as is the case in the prior art. Instead of the contact, an elongated guide is present for the guide element in the region of this rotary bearing, which may be produced with a simple and small construction by a guide hole in a pivot pin, in which the guide element may be displaced to and fro in its longitudinal direction.

In the region of the end of the guide element facing away from the sliding guide, the rotary bearing present at that point may also be produced with a simple and narrow construction by the rotary bearing being formed by a limb projecting substantially at right angles, and which is rotatably mounted in a bearing hole in the associated pivot bearing part.

It is furthermore advantageous to configure the end region of the guide element associated with the sliding guide as a round wire loop, the extension plane thereof preferably extending at right angles to the pivot axis of the pivot bearing and/or the bearing limb. This embodiment may also be implemented with a simple and narrow construction, the required structural width being barely larger than the cross-sectional dimension of the guide element. This may be preferably implemented by a wire of round cross-section which is preferably formed in one piece and of which the wire loop and/or bearing limb are formed in one piece by bending and forming.

For reasons of a favourable use of space, it is also advantageous to configure the sliding guide for the one end of the elongated guide element on the pivot bearing part forming a housing base and to configure the rotary bearing facing away from the sliding guide on the pivotable pivot bearing part.

The sliding guide may be advantageously formed by a bore, in particular a blind bore, receiving the round joint head. This may be particularly favourably produced on the housing base as the housing base has a wider cross-sectional dimension than the pivotable pivot bearing part and therefore the bearing bore may be produced, whilst at the same time a smaller construction may be ensured.

In order to increase the stability of the cage segment guide, two cage segment guides may be arranged spaced apart from one another in the pivoting direction on one face or both faces of the axial piston machine, which may in particular be of the same configuration and which may be configured and arranged in a mirror-inverted manner relative to a longitudinal centre plane of the axial piston machine extending at right angles to the pivot axis.

BRIEF DESCRIPTION OF THE DRAWINGS

Advantageous designs of the invention are described in more detail hereinafter with reference to embodiments and drawings, in which.

DETAILED DESCRIPTION OF EXEMPLARY EMBODIMENTS

Figure 1:
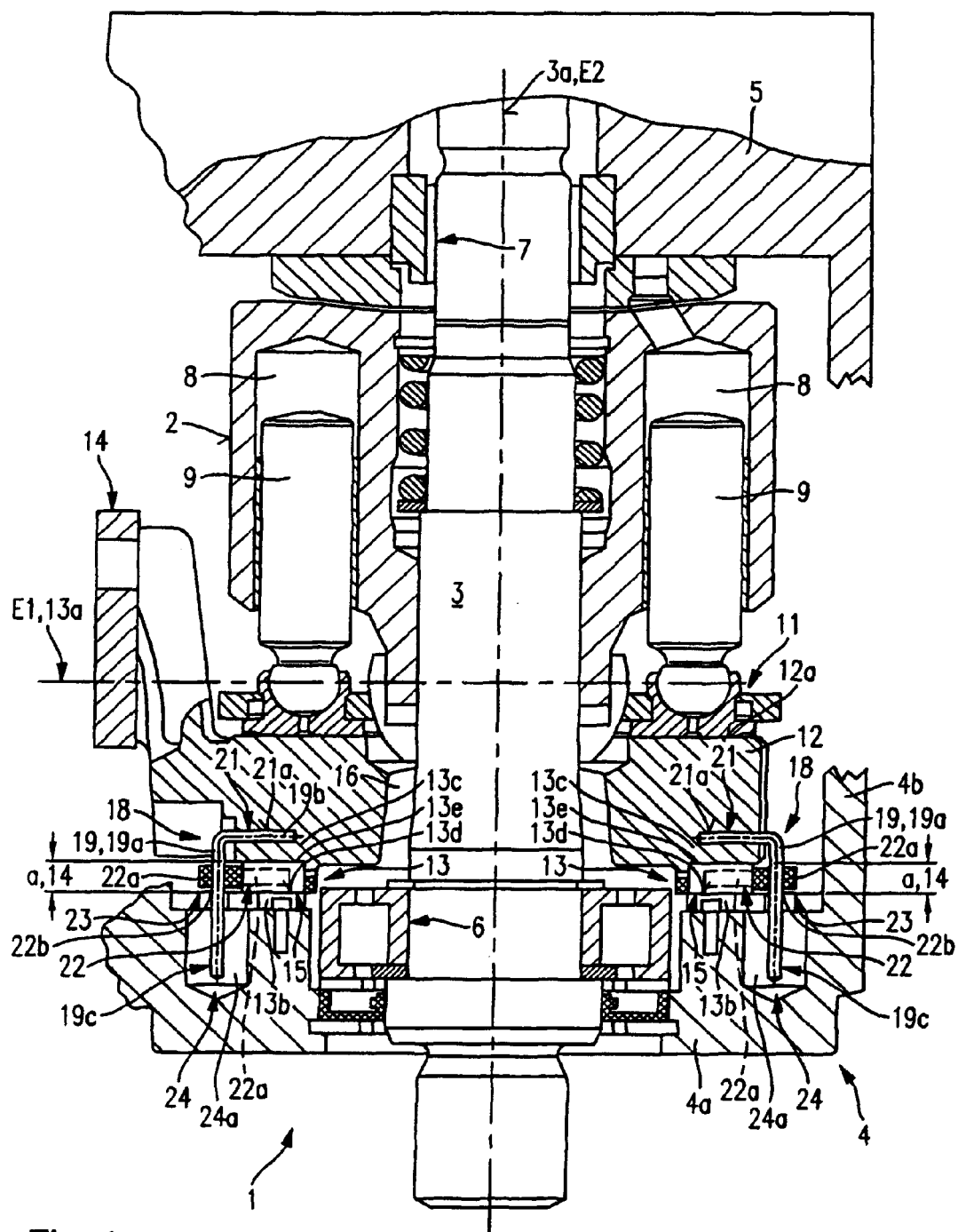
FIG. 1 shows an axial piston machine according to the invention in axial section.

According to FIG. 1 shows the axial piston machine denoted in its entirety by 1 with a cylinder drum 2 which is located fixedly in terms of rotation on a shaft 3 with a suitable axial hole and which is mounted rotatably with the shaft 3 in a housing 4 shown in outline.

The housing comprises, for example, a housing base 4a, from which a partially shown peripheral wall 4b extends in a cup-shaped manner towards a lid 5, which seals the cup-shaped housing 4 and is configured as a so-called connector for supply and discharge lines of a hydraulic line circuit. The shaft 3 is rotatably mounted in rotary bearings 6, 7 on the housing base 4a and the lid 5, said shaft forming a drive shaft or output shaft according to the use of the axial piston machine as a pump or as a motor.

A plurality of cylinder bores 8 are distributed on one periphery in the cylinder drum 2, which are able to extend parallel to the axis of rotation 3a of the shaft 3 or even inclined thereto, and in which pistons 9 are mounted to be able to be displaced to and fro and which project over the cylinder drum 2 on its side facing away from the lid 5 and which are supported on a swashplate 12 by means of sliding blocks 11. The swashplate 12 is mounted to be able to pivot to and fro in a pivot bearing 13 about a pivot axis 13a, which extends in a transverse plane E1 which runs at right angles to the axial plane E2 containing the axis of rotation 3a.

By pivoting the swashplate 12 by means of an adjusting member 14, shown only in outline, the through-put volume of the axial piston machine 1 may be optionally reduced or increased. In the zero pivoted position according to FIG. 2, the axial piston movement and the through-put volume are zero or at least very low. In the pivoted position according to FIG. 3 which is pivoted-out about the pivot angle W1 to a maximum extent, the piston movements and the through-put volume are at a maximum.

The swashplate 12 is pivotably mounted in the pivot bearing 13 formed by two pivot bearing parts 13b, 13c, which are arranged adjacent to one another along the axis of rotation 3a, and have on their sides facing one another, respectively on both sides of the shaft 3, two curved bearing surfaces 13d, 13e, in the shape of a circular arc section, which are at a distance a from one another extending parallel to the axis of rotation 3a. In the gap 14 thus formed, a cage segment 15 is arranged with a plurality of rolling elements 13f. On the embodiment, the bearing surfaces are configured in the shape of a cylinder section and the rolling elements 13f are configured as cylindrical. The radial outer pivot bearing part 13b may be formed by two bearing shells, which are laterally guided on both sides of the axis of rotation 3a and are arranged centered on the pin, inside on the housing base 4a.

Within the scope of the invention, the bearing surfaces 13d, 13e present on both sides of the shaft 3, may also be formed respectively by a common bearing surface, which penetrates the shaft 3 in a through-passage hole 16 which, as a slot, for example, is aligned in the pivoting direction according to the double arrow 17, to be sufficiently large for the pivotable pivot bearing part 13c to be able to carry out its pivoting movements.

In the embodiment, the pivotable pivot bearing part 13c forms the swashplate 12, the planar sliding surface 12a of the swashplate 12 and the associated bearing surface and/or bearing surfaces 13e being arranged on sides of the swashplate 12 facing away from one another.

During functional operation of the axial piston machine 1, when pivoting the swashplate 12, the pivoting path of the cage segment 15 is respectively approximately half the size of the pivoting path of the swashplate 12. This is predetermined by the rolling of the rolling element 13f. As there is no positive connection between the pivot bearing parts 13b, 13c and the rolling elements 13f, there is the risk that, in particular with sudden and rapid pivoting movements, the position of the cage segment 15 is displaced, in other words slips, relative to the pivot bearing parts 13b, 13c in one or the other pivoting direction. The pivot bearing 13 is damaged as a result.

In order to avoid this, one respective guide device denoted in its entirety by 18, is associated with the cage segment(s) 15, with an elongated guide element 19 which passes over the gap 14 and is connected respectively pivotably, and also partially movably in its longitudinal direction, to the cage segment 15 and the pivot bearing parts 13b, 13c and thus is able to hold the cage segment 15 in its desired position relative to the pivot bearing parts 13b, 13c and during the pivoting operation is able to guide and/or control the cage segment during its pivoting movement.

The guide element 19 is an elongated, in particular pin-shaped component, which in the embodiment consists of a profiled part, for example in the form of a wire 19a, in particular made of metal such as steel. The cross-sectional shape of the guide element 19 is preferably circular. It is pivotably mounted on one of its two ends by a rotary bearing 21 with a bearing hole 21a, which extends parallel to the pivot axis 13a and in which a bearing limb 19b projecting transversely from the guide element 19 is pivotably mounted. The bearing limb 19b is preferably an elongated portion bent back at right angles from the wire 19a. In this first rotary bearing 21, the guide element 19 is rigidly mounted in its longitudinal direction on the pivotable pivot bearing part 13c.

The guide element 19 is pivotably mounted by a second rotary bearing 22 with the cage segment 15 about an axis of rotation extending parallel to the pivot axis 13a, this second rotary bearing 22 being combined with a longitudinal guide 23 for the guide element 19, so that the guide element 19 during a rotational movement in the second rotary bearing 22 is able to carry out a longitudinally oriented movement in its one longitudinal direction or its other longitudinal direction.

The second rotary bearing 22 is formed by a pivot pin 22a, which is rotatably mounted pivotably on the associated cage segment 15 about an axis of articulation extending parallel to the pivot axis 13a, the guide element 19 penetrating the pivot pin 22a with little freedom of movement in a guide hole 22b. The elongated guide 23 is formed as a result.

The guide element 19 is connected by a sliding guide 24, in its end region facing away from the first rotary bearing 21, to the non-pivotable pivot bearing part 13b. The sliding guide 24 is formed by only two guide elements, namely by a round joint head 19c, which is mounted in a recess 24a, in particular a blind recess accessible from the inside and sealed outwardly, with two recess walls opposing one another and defining the joint head 19c with little freedom of movement, on the non-pivotable pivot bearing part 13b.

In one embodiment, in which the guide element 19 is located laterally adjacent to the non-pivotable rotary bearing part 13b, the recess 24a may be formed by walls projecting approximately parallel from the pivot bearing part 13b. In the embodiment in which the non-pivotable pivot bearing part 13b laterally projects over the rotary bearing 21, 22, the recess 24a is formed by a bore which is preferably bored from inside into the non-pivotable pivot bearing part 13b and/or into the housing base 4.

The round joint head 19c is formed by a ring, preferably by a loop of the guide element 19, bent in one piece, the plane of the ring and/or the loop extending parallel to the pivot plane and at right angles to the bearing limb 19b. In the aforementioned embodiment, the guide element 19 is formed with the pivot pin 22a by a wire, bent in one piece, which is characterised by a small consumption of material, low weight and by relatively high strength.

Figure 2:
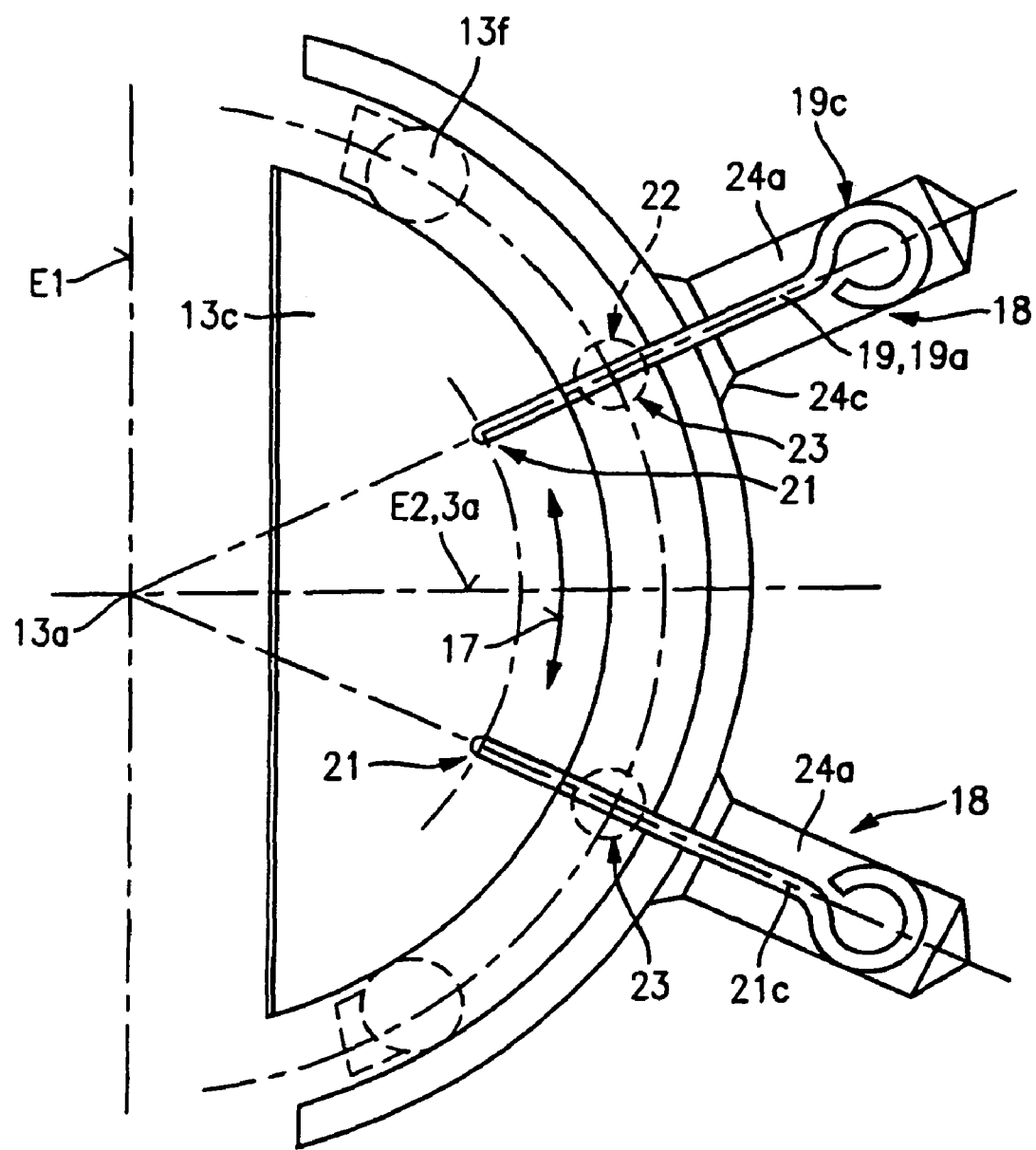
FIG. 2 shows a pivot bearing of the axial piston machine with a cage segment guide in an enlarged view, the pivot bearing being located in its minimum pivoted-out position relative to the zero pivoted position.
Figure 3:
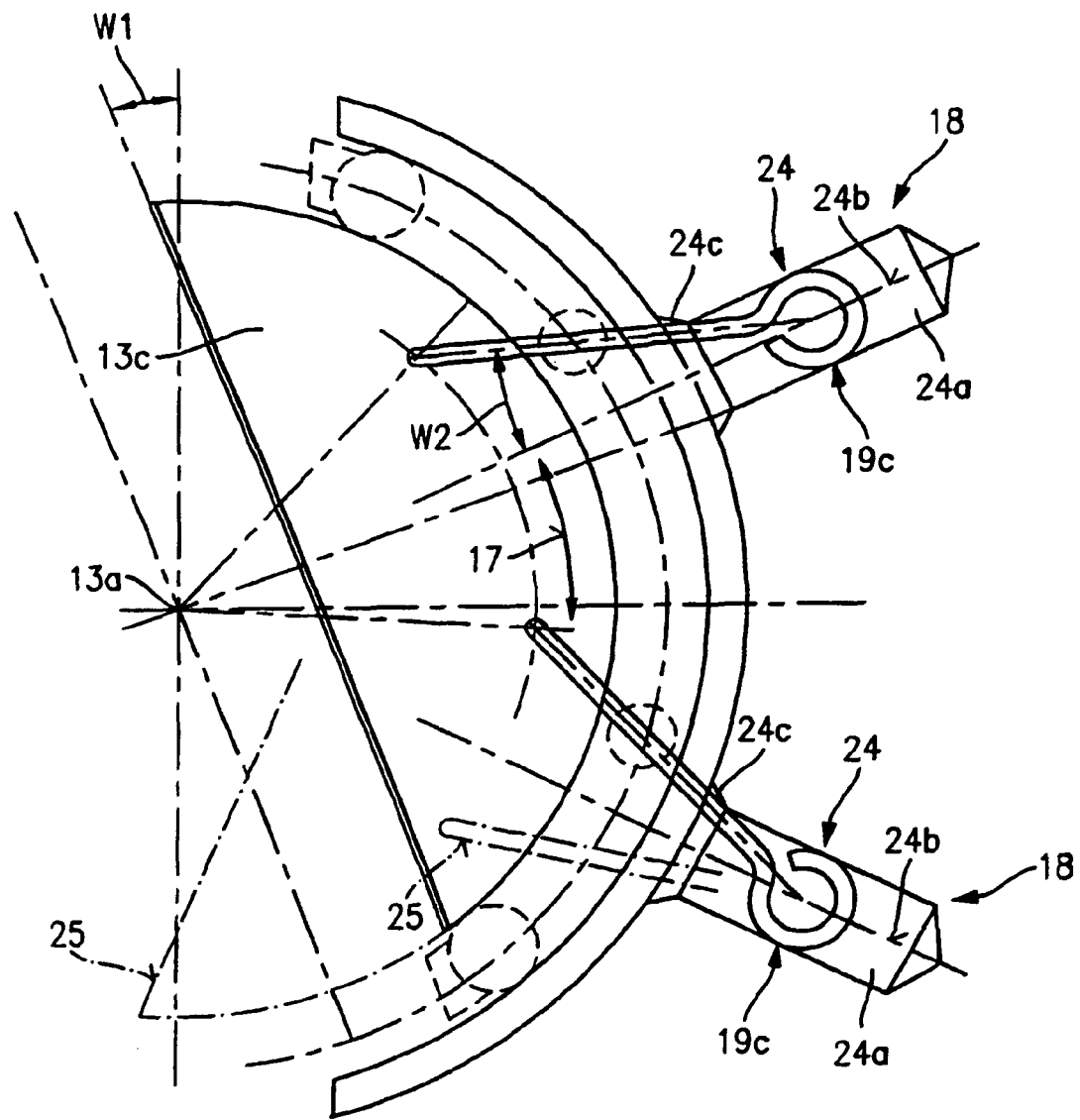
FIG. 3 shows the pivot bearing in one of its maximum pivoted-out pivoted positions.

During functional operation of the axial piston machine 1, the pivotable pivot bearing part 13c may be displaced to and fro by the adjusting device only shown in outline at 14, between the zero position shown in FIG. 2 and the maximum pivoted-out position shown in FIG. 3. In this connection, the guide element 19 is forcibly pivoted therewith, exerting its guiding function on the cage segment 15 in any possible pivoted position.

The axial piston machine is preferably configured such that in the zero position of the pivotable pivot bearing part 13c the guide element 19 is located relative to its centre axis 21c in a radial position relative to the pivot axis 13a and thus relative to the centre axis 24b of the sliding guide 24 in a zero position.

For an axial piston machine 1 of which the pivotable pivot bearing part 13c may be pivoted beyond the zero position into the opposing maximum pivoted position, shown in outline in FIG. 3, the guide element 19 may also be pivoted beyond its zero position into its opposing maximum pivoted position, which is shown in outline in FIG. 3 and denoted by 25. In order to achieve a maximum pivoting angle W2 which is as large as possible, with a cross-sectional size of the sliding guide 24 which is as small as possible, it is advantageous to form a bevelled edge 24c on the edge of the recess 24a and/or the bore forming the sliding guide 24, and which allows a greater maximum pivoting angle W2, as FIG. 3 shows.

In order to provide a relatively large guiding force with a desirably small construction of the guide device 18 and/or the guide element 19, it is advantageous to provide a plurality of, for example two, guide devices 18 arranged offset to one another in the peripheral direction, whereby the guiding force is doubled. In the embodiment, the guide devices 18 are arranged equally offset at an angle relative to the axis of rotation 3a of the axial piston machine, towards both sides.

Moreover, in the present embodiment, in which pivot bearings 13 are provided on both sides of the shaft 3 with two cage segments 15 independent of one another, on both sides respectively one or more, for example two, guide devices 18 offset in the pivoting direction, are provided with guide elements 19, which are configured and arranged, in particular, equally and preferably in a mirror-inverted manner relative to the longitudinal plane E2 extending at right angles to the pivot axis 13a and containing the axis of rotation 3a.

The invention claimed is:

1. An axial piston machine of swashplate construction, with a first pivot bearing part supported on a housing and a second pivot bearing part pivotably mounted thereon about a pivot axis and forming a swashplate, the pivot bearing parts comprising curved bearing surfaces in the shape of a circular arc section on sides facing one another, a gap being arranged between said curved bearing surfaces, a cage segment being pivotably mounted in said gap with a plurality of rolling elements about the pivot axis, the cage segment being guided by an elongated guide element extending transversely to the gap and projecting over the gap, said guide element having on one end an integrally formed ring guide body, said integrally formed ring guide body being pivotably mounted in a sliding guide and slidable along the sliding guide, said sliding guide being arranged on the first pivot bearing part,
   wherein the guide element is pivotably connected to the cage segment by a first rotary bearing and pivotably connected to the second pivot bearing part by a second rotary bearing,
   wherein the guide element, in the region of said first rotary bearing, is displaceably connected to the cage segment by an elongated guide in a longitudinal direction of the guide element, and the guide element, in the end region thereof connected to the second pivot bearing part, is rotatable by the second rotary bearing and rigidly connected in said longitudinal direction to the second pivot bearing part, and
   wherein at least two guide elements are arranged in the pivoting direction, offset at an angle relative to one another.

2. The axial piston machine according to claim 1, wherein the second rotary bearing is formed by a bearing hole extending substantially parallel to the pivot axis in the second pivot bearing part, in which a bearing limb projecting transversely from the guide element is pivotably mounted.

3. The axial piston machine according to claim 1, wherein the first rotary bearing is formed by a pivot pin projecting from the cage segment, which is rotatably mounted in the cage segment and in which a transversely extending guide hole is arranged, the guide element being displaceably guided to and fro in said guide hole in said longitudinal direction.

4. The axial piston machine according to claim 1, wherein, between the integrally formed ring guide body and the second rotary bearing, the guide element is configured in the form of a prismatic pin extending in a linear manner.

5. The axial piston machine according to claim 1, wherein the guide element is produced in one piece.

6. The axial piston machine according to claim 1, wherein the guide element consists of metal.

7. The axial piston machine according to claim 6, wherein the guide element is bent from a wire.

8. The axial piston machine according to claim 7, wherein the guide element consists of steel.

9. The axial piston machine according to claim 1, wherein, in a pivoted-in zero position of the pivotable pivot bearing part, the guide element and the sliding guide extend radially relative to the pivot axis.

10. The axial piston machine according to claim 1, wherein the curved bearing surfaces in the shape of a circular arc section are presented on both sides of a shaft mounted rotatably in the housing, and the curved bearing surfaces are formed by a common bearing surface which penetrates the shaft through a through-passage hole, the cage segments being arranged between the curved bearing surfaces, the cage segment being guided through guide elements arranged in a mirror-inverted manner relative to one another.

11. The axial piston machine according to claim 1, wherein, between the integrally formed ring guide body and the second rotary bearing, the guide element is configured in the form of a cylindrical pin having a round cross-section, extending in a linear manner.

* * * * *